United States Patent

[11] 3,596,445

| [72] | Inventors | Theodorus Lievers<br>Gaanderen;<br>Herbert Vissers, Nieuw-Vennep, both of,<br>Netherlands |
|---|---|---|
| [21] | Appl. No. | 694,995 |
| [22] | Filed | Jan. 2, 1968 |
| [45] | Patented | Aug. 3, 1971 |
| [73] | Assignee | Landbouwwerktuigen-en Machinefabriek<br>H. Vissers N.V.<br>Nieuw-Vennep, Netherlands |
| [32] | Priority | Jan. 13, 1967, July 14, 1967, Sept. 27,<br>1967 |
| [33] | | Netherlands |
| [31] | | 67.00613, 67.09251 and 67.13134 |

[54] A DEVICE FOR MOWING CROP
24 Claims, 12 Drawing Figs.

[52] U.S. Cl............................................. 56/13.7,
56/157, 56/14.1, 56/14.5
[51] Int. Cl........................................................ A01d 43/00
[50] Field of Search........................................... 56/20, 21,
22, 23, 24, 25.4, 220, 192, 153, 157, 193,
121.44, 121.45, 289, 317, 1

[56] References Cited
UNITED STATES PATENTS
955,019  4/1910  Ufford........................ 56/121.45 X

| 3,387,612 | 6/1968 | Tillotson..................... | 56/1 X |
| 3,402,533 | 9/1968 | Johnston et al.............. | 56/1 X |
| 3,469,378 | 9/1969 | Heesters et al. ............. | 56/6 |
| 3,492,798 | 3/1970 | Hart............................. | 56/317 X |
| 3,233,395 | 2/1966 | Dahl et al. ................... | 56/220 X |

FOREIGN PATENTS

| 1,309,749 | 10/1962 | France ......................... | 56/317 |
| 244,036 | 3/1963 | Australia...................... | 56/23 |
| 152,038 | 6/1953 | Australia...................... | 56/23 |
| 1,378,634 | 12/1964 | France ......................... | 56/23 |
| 1,407,189 | 12/1965 | France ......................... | 56/25.4 |
| 867,140 | 5/1961 | Great Britain................ | 56/23 |

Primary Examiner—Louis G. Mancene
Assistant Examiner—J. A. Oliff
Attorney—Imirie, Smiley, Snyder & Butrum ABSTRACT: A method and a device for mowing crop according to which the crop is cutoff by one or more mowing elements and the invention has for its object to reduce the frictional resistance which the mowing elements encounter at the crop cutoff.

The mowing elements cooperate with a conveying member which raises the crop and takes it up during the cutting off and discharges it after the cutting off. To this end a conveying member e.g. shaped as a rotor is provided and cooperates with the mowing elements for raising the crop and discharging it after this cutting off, so that the mowing elements do not come into contact with the crop cutoff.

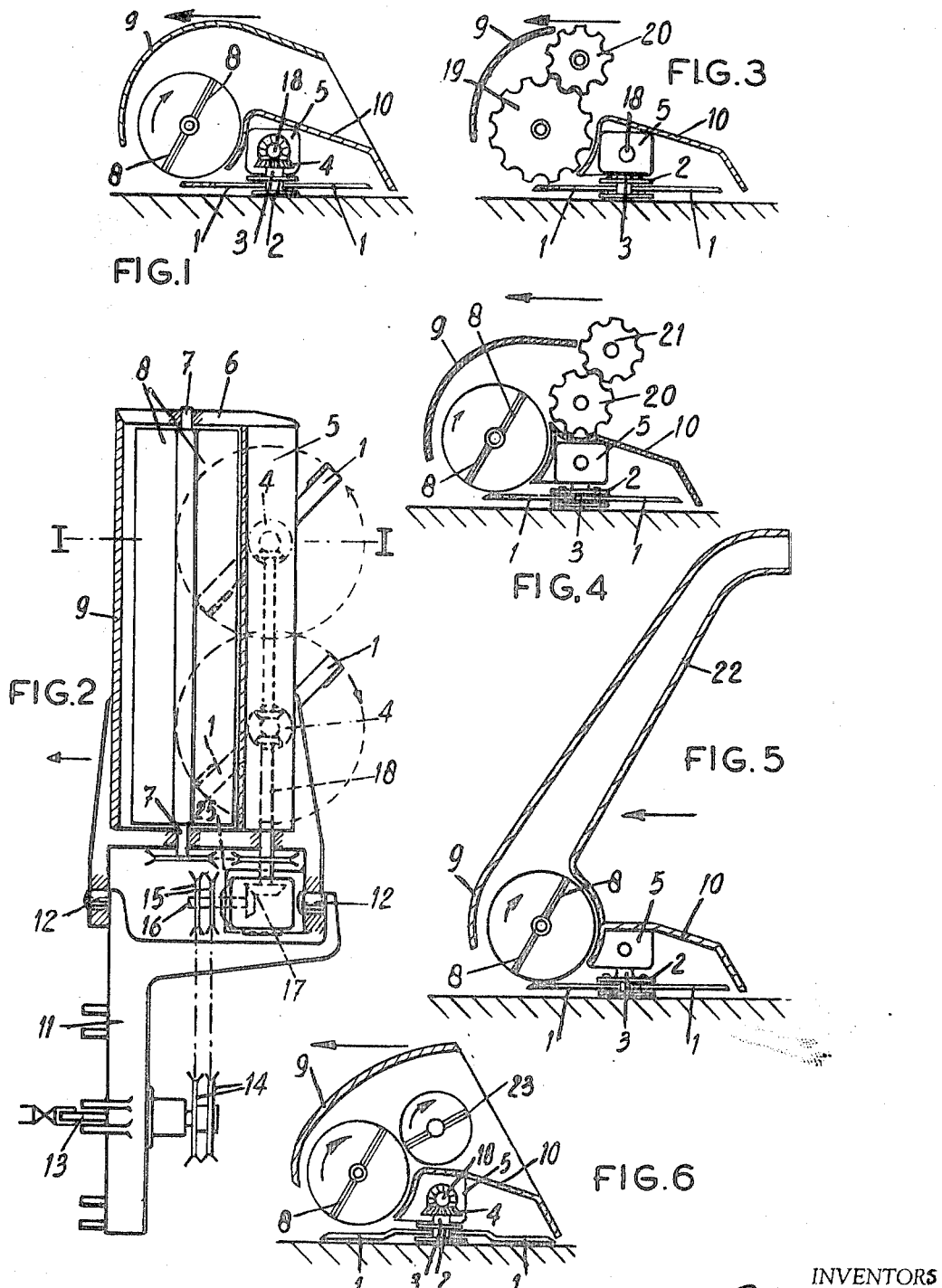

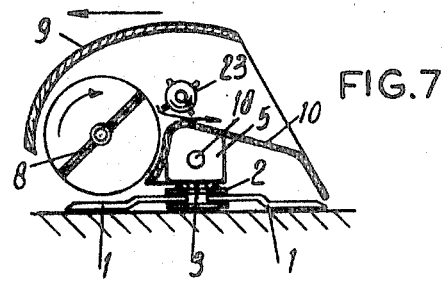
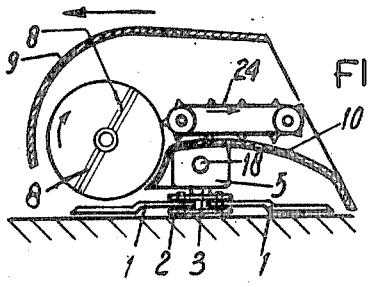
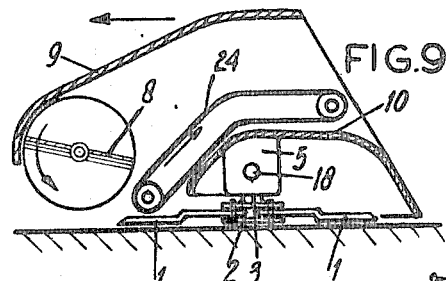
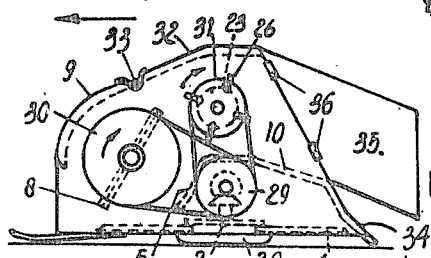
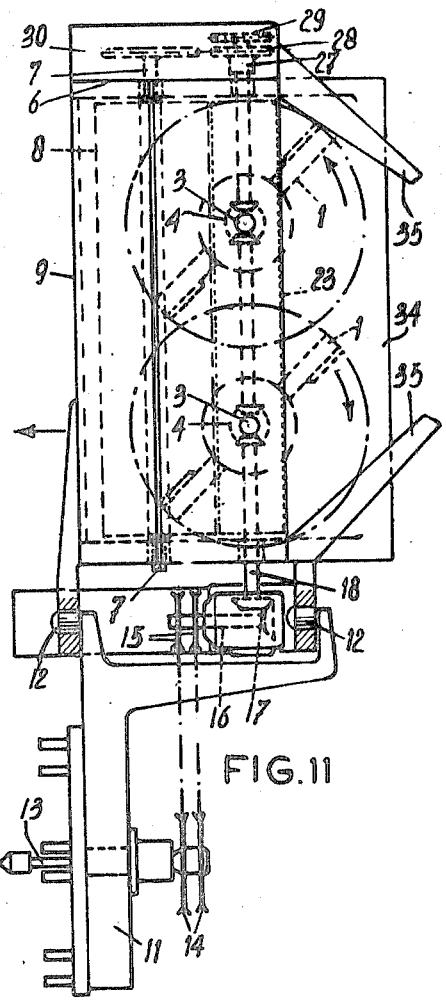
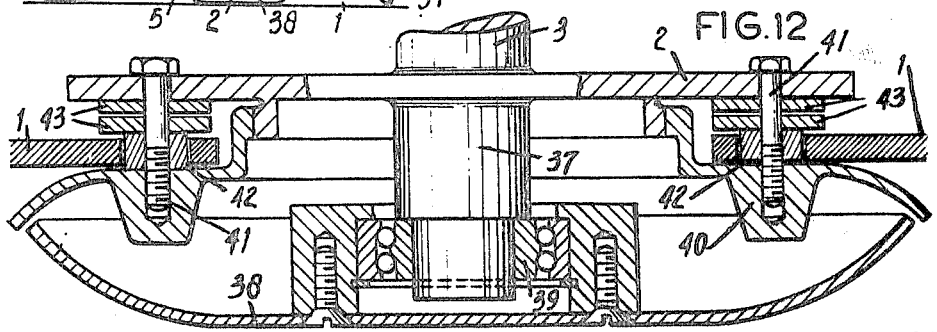

A DEVICE FOR MOWING CROP

This invention relates to a device for mowing crop according to which the crop is cutoff by one or more mowing elements.

When a crop which has been beaten down and thus lies close to the ground is to be mowed the drawback occurs that the mowing elements may move over the crop without cutting it off. As the mowing elements themselves have to convey the crop cutoff to the rear a further drawback occurs in that at least some of the crop at least may fall into the mowing elements when it increases the frictional resistance as the crop is cutoff.

The invention has for its object to remove said drawbacks and according to the invention the crop to be mowed is taken up during the cutting off and conveyed over the mowing elements without contacting said elements during said conveying step. To this end the mowing element may cooperate with a conveying member which raises the crop and takes it up during the cutting off and discharges it after the cutting off. Inasmuch as the mowing elements therefore do not come into contact with the crop after it is cutoff, said elements encounter less friction, whereby the required power for the mowing elements with the conveying member will be smaller than with a device in which only the mowing elements have to convey the crop cutoff. The efficiency of conveying the crop over the mowing elements after it is cutoff may be furthered by arranging an auxiliary conveying member behind the main conveying member. Preferably the circumferential speed of the main conveying member would be smaller than the circumferential speed of the auxiliary conveying member. The velocity which the cutoff crop obtains from the main conveying member is then increased by the auxiliary conveying member and the required power for driving the device will be smaller as compared to a device in which both conveying members have the same circumferential speed.

The invention will be further described below with reference to the accompanying drawings showing several embodiments.

In the drawings:

FIG. 1 is a cross-sectional view of a first embodiment taken on line I-I;

FIG. 2, which itself is a plan view with a part in horizontal section;

FIGS. 3—9 each show a cross-sectional view of different embodiments of the device according to the invention;

FIG. 10 is an end view of still another embodiment of the device according to the invention and FIG. 11 is a plan view thereof with part in horizontal section;

FIG. 12 is a sectional elevation on enlarged scale of a supporting disc for a mowing element.

With the embodiment illustrated in the drawings two mowing elements are provided, which each have a pair of radial-cutting arms 1 projecting at a hub 2 secured on a vertical stub shaft 3. On each of the stub shafts 3 a conical gearwheel 4 is secured in an elongated casing 5, supported at a frame 6.

A rotor with its journals 7 is supported in the frame and said rotor is provided with two or more blades 8 consisting of sheet metal or of synthetic material, rubber or a like flexible elastic material. With the embodiments according to FIGS. 1, 2 and 4 the rotor 8 at its front and also at its top is enclosed by a hood 9, which at the rear may be extended by a substantially flat plate. The rotor blades 8 in the casing 9 will generate a powerful airflow which not only furthers the raising of the crop to be cutoff, but also contributes to the crop being thrown to the rear over the top of the rotor. A plate or grid 10 covers the mowing elements 1 at the rear, so that crop cutoff is prevented from falling down on said elements.

The frame 6 in which the rotor 8 and the mowing elements 1, 2 are supported may be pivoted on horizontal journals 12 at a holder 11 adapted to be connected to a tractor and at which a shaft 13 is supported which may be coupled to the mower takeoff shaft of the tractor. The shaft 13 carries one or more rope pulleys 14 or the like which transmit the drive to rope pulleys 15 secured on a shaft 16 transmitting the motion through a gear 17 to a shaft 18 for driving the toothed wheels 4 of the mowing elements 1. Said drive is arranged in such a manner that the mowing elements 1 are rotating oppositely to each other and moreover the lateral spacing of the shafts 3 has such a value that the mowing elements are overlapping so that there will be only a small dead angle between the elements.

The shaft 18 through the intermediary of a rope or belt drive also drives the shaft 7 of the rotor 8.

With the embodiment according to FIG. 3 the rotor at its periphery is provided with axial ribs 19 so that it may operate as a bruising roll and the crop may be bruised between the rotor and a second bruising roll 20. Said rolls 19 and 20 may also exert a shearing action.

With the embodiment according to FIG. 4 a separate set of bruising or shearing rolls 20, 21 is arranged behind the rotor 8.

With the embodiment according to FIG. 5 the hood 9 is extended to a discharge conduit 22 so that the crop cutoff may be discharged at a certain level above the ground. The front wall of the gear box 5 here is curved according to the track described by the ends of the rotor blades 8.

With the embodiment according to FIG. 6 an auxiliary conveying element shaped as a second rotor 23 is arranged behind the rotor 8 and is driven in the same direction as the foremost rotor. The hood 9 at the rear is extended over the auxiliary rotor 23.

The crop falling down behind the foremost rotor 8 is seized by the auxiliary rotor 23 so that the space in the hood 9 behind the rotor 8 cannot become clogged and a free discharge of the crop from the hood is ensured.

With the embodiment according to FIG. 7 the auxiliary conveying member also consists of a rotor 23, but said rotor rotates oppositely to the foremost rotor 8, so that the rotor 23 discharges the crop falling down in the hood 9 over the plate 10 to the rear and also partly returns it to the foremost rotor.

With the embodiment according to FIG. 8 the auxiliary conveying member consists of a horizontal conveying band 24 having its upper lap moving to the rear and taking up the material thrown backwards by the rotor 8 and tending to fall down and said conveying lap discharges it from the hood 9.

With the embodiment according to FIG. 9 also a conveying band 24 as an auxiliary conveying member is arranged behind the rotor 8 and said band has its foremost part inclined upwards and the rotor 8 rotates in opposite direction so that the crop to be cutoff is seized between the rotor and the band 24.

With the embodiments according to FIGS. 6 and 7 the rotor 23 may be replaced by two or more rotors of smaller diameter.

With the embodiment according to FIGS. 10 and 11 an auxiliary rotor 23 is arranged behind the rotor 8 and is rotated in the same direction as said foremost rotor 8. Said auxiliary rotor 23 has a larger number of blades than the rotor 8, e.g., four blades 26. With said embodiment the driving shaft 18 of the mowing elements 1, 2 through the intermediary of an overload coupling 27 is connected to a pair of rope pulleys 28, 29 having its pulley 28 driving the rope pulley 30 secured on a journal 7 of the rotor 8 and its rope pulley 29 driving the pulley 31 secured on the shaft of the auxiliary rotor 23 in such a manner that the circumferential speed of the rotor 23 is larger than that of the main rotor 8.

The rearmost part 32 of the hood 9 above the auxiliary rotor 23 has a spring hinge 33 so that said part of the hood may yield upwards. The covering plate 10 above the mowing elements is bent obliquely downwards to the rear beyond said elements to below the plane of said elements, so that said bent part 34 will not allow foreign bodies to pass but will reflect such bodies to the ground.

At the rear of the frame, e.g., two swath plates 35 by means of hinges 36 are connected to the frame, so that the width of the swath obtained may be varied.

As shown in FIG. 12 the stub shaft 3 below the disc 2 of the mowing element is extended by a part 37 and the supporting disc 38 by means of a ball race 39 is supported freely rotatable on the extension 37 of the shaft 3. The mowing knives 1 are enclosed between the disc 2 and a covering plate 40 of the disc 38 and rotatable about rings 42 secured by bolts 41 between the disc 2 and the plate 40 and said bolts also serve for securing the covering plate 40 to the disc 2. For vertically adjusting the mowing knives 1 with respect to the disc 2 distance bodies 43 are provided and by placing one or both of said bodies below the ring 42 the knives 1 will be moved to a higher level.

The bolts 42 for securing the covering plate 40 to the mowing disc 2 may be replaced by rapidly releasable connecting means, e.g., by projections.

The mowing elements 1, 2 are rotated oppositely to each other and their overlapping is rather large as tests have shown that said overlapping should be at least 8 centimeters, as with a smaller overlapping the crop is not or insufficiently cutoff between two adjacent mowing elements, so that crop remains on a strip between the mowing elements.

What we claim is:

1. A crop-mowing device comprising a frame adapted to be moved along a path, movable driven mowing means supported by said frame, conveying means including a driven rotor supported by said frame for rotation about a transversely extending generally horizontal axis, said rotor having a portion thereof disposed directly above and forwardly of the forwardmost path of movement of said mowing means, said rotor including transversely extending projection means provided on the full length of the portion of the rotor over said forwardmost path of movement of the mowing means and which is movable in a circular path when the rotor is rotated about said axis, and driving means for driving said mowing means and said conveying means, said projection of the driven rotor being movable upwardly and forwardly at a point forwardly of the forwardmost path of movement of said mowing means to raise a crop as it is cut and which conveys the cut crop rearwardly over said mowing means to discharge the cut crop behind said mowing means.

2. A device as claimed in claim 1, characterized in that said rotor at its front and at its top is enclosed by a hood.

3. A device as claimed in claim 1, characterized in that said projection means consists of blade-shaped vanes.

4. A device as claimed in claim 1, characterized in that the projection means is yieldable.

5. A device as claimed in claim 2, characterized in that at least a portion of the hood is narrowly enclosing said rotor.

6. A device as claimed in claim 2, characterized in that at least a portion of the hood is narrowly enclosing said rotor and is adapted to yield upwards.

7. A device according to claim 1, characterized in that the rear part of the mowing means is covered by a cover.

8. A device as claimed in claim 1, characterized in that a cover covering the rear part of the mowing means extends beyond the mowing means and is downwardly inclined to below a plane in which said mowing means lie.

9. A device as claimed in claim 1, characterized in that the mowing means consists of at least one upstanding shaft driven by said driving means and carrying at least two mowing knives rotating in a lying plane.

10. A device as claimed in claim 1, characterized in that that the mowing means consists of at least two upstanding shafts, each carrying at least two rotating mowing knives, said shafts being driven in opposite direction of rotation, the ends of the knives of adjacent shafts overlapping each other during rotation thereof.

11. A device according to claim 1, characterized in that the mowing means comprises a driving gear located closely above said mowing means.

12. A device as claimed in claim 1, characterized in that a cover covering the rear part of the mowing means is joined to a part of a casing enclosing a driving gear of the mowing means.

13. A device as claimed in claim 1, characterized in that the rear of the rotor nearly contacts the front side of a casing enclosing a driving gear of the mowing means.

14. A device as claimed in claim 1, characterized in that a hood covering the conveying means at least at the top is extended to an upstanding conduit in which the crop is discharged upwards.

15. A device as claimed in claim 1, characterized in that said conveying means comprises an auxiliary conveying member arranged behind said rotor.

16. A device as claimed in claim 1, characterized in that said conveying means comprises an auxiliary conveying member arranged behind said rotor, the circumferential speed of the rotor being smaller than the circumferential speed of the auxiliary conveying member.

17. A device according to claim 1, characterized in that said conveying means comprises said rotor and an auxiliary rotor.

18. A device according to claim 1, characterized in that the conveying means comprises said rotor and an auxiliary rotor, both rotors being driven in the same direction of rotation.

19. A device as claimed in claim 17, characterized in that the rotor comprises a number of blades and that the auxiliary rotor comprises a greater number of blades than the rotor.

20. A device as claimed in claim 1, characterized in that said conveying means comprises said rotor executed as a bruising roll and an auxiliary bruising roll cooperates therewith for bruising the crop cutoff.

21. A device as claimed in claim 1, characterized in that the conveying means comprises said rotor and a pair of bruising rolls arranged behind said rotor.

22. A device as claimed in claim 1, characterized in that the conveying means comprises said rotor and an auxiliary conveying element consisting of a substantially horizontal conveying band having its upper lap moving rearwards.

23. A device as claimed in claim 1, characterized in that the circumferential speed of the rotor is at least 50 percent larger than the forward-traveling speed of the frame.

24. A crop-mowing device comprising a frame adapted to be moved along a path, movable driven mowing means supported by said frame, conveying means including a driven rotor supported by said frame for rotation about a transversely extending generally horizontal axis, said rotor having a portion thereof disposed directly above and forwardly of the forwardmost path of movement of said mowing means, said rotor including transversely extending projection means provided on the full length of the portion of the rotor over said forwardmost path of movement of the mowing means and which is movable in a circular path when the rotor is rotated about said axis, driving means for driving said mowing means and said conveying means, said projection of the driven rotor being movable upwardly and rearwardly at the rear of the rotor, an auxiliary conveyor member spaced rearwardly of said rotor and above said mowing means, said auxiliary conveyor member spaced rearwardly of said rotor and above said mowing means, said auxiliary conveyor member comprising a band having the forward portion thereof inclined upwardly and rearwardly and being movable in an upward and rearward direction so that the cut crop passes between said rotor and said band to convey the cut crop rearwardly over the mowing means to discharge the cut crop behind said mowing means.